Jan. 12, 1932.　　　E. E. CULBERTSON　　　1,841,349
UNIVERSAL JOINT
Filed Aug. 13, 1928　　　3 Sheets-Sheet 1

E. ESTAY CULBERTSON
INVENTOR

BY
ATTORNEYS

Jan. 12, 1932.  E. E. CULBERTSON  1,841,349
UNIVERSAL JOINT
Filed Aug. 13, 1928   3 Sheets-Sheet 2

E. ESTAY CULBERTSON
INVENTOR
BY Whittemore Hulbert
Whittemore & Belknap
ATTORNEYS

E. ESTAY CULBERTSON
INVENTOR
BY
ATTORNEYS

Patented Jan. 12, 1932

1,841,349

UNITED STATES PATENT OFFICE

E ESTAY CULBERTSON, OF DETROIT, MICHIGAN, ASSIGNOR TO THE SPICER MANUFACTURING CORPORATION, A CORPORATION OF VIRGINIA

UNIVERSAL JOINT

Application filed August 13, 1928. Serial No. 299,199.

This invention relates to universal joints and resides particularly in the construction of oil storage chambers, the method of charging them and of lubricating the bearings.

The joints in current usage are of the type wherein an intermediate member is provided such as a ring or cross to which the driving and driven shafts are swivelably connected. In the lubricating of these joints, it has been the practice to provide a single reservoir formed in the intermediate member from which lubricant is supplied to each and all of the different bearing surfaces. In these constructions, should it happen that the manufacturing limits designed to give clearance for an oil film between the gudgeon and its seat, be slightly under normal, excessive heat during operation results therefrom, and in many cases results in total destruction of the intermediate member and sometimes of the entire joint by what is called "burning out" of bearings. In other cases this excessive heat condition reduces the viscosity of the entire lubricant body thereby rendering it much less efficient. This reduction in efficiency reacts to cause excessive wearing of the remaining bearing surfaces, because of the inefficiency of the oil body at these places to absorb the loads and allows the surfaces to bear upon each other. In addition, should by any means or for any reason, a leakage occur in this single reservoir type, the entire lubricant body is permitted to escape which in turn robs all bearings of any lubricant.

Applicant's invention is designed to eliminate this objectionable feature by discarding the single reservoir and providing in its stead, a plurality of independent oil storage chambers, one for each bearing. With this arrangement, if the viscosity of the oil of one storage chamber is reduced because of one reason or another, this condition is not transmitted to the lubricant in the other chambers but is confined to its individual chamber until such condition is automatically adjusted within the confines of its own walls.

The invention lies in the arrangement of annular lubricant containing chamber wholly or partially surrounding the bearing and extending over the end of the trunnion so that the action of centrifugal force upon the lubricant in the portion surrounding the bearing tends to feed the lubricant to the bearing so that the end thereof will be immersed. A further object is to design the lubricant chamber surrounding the bearing so that centrifugal force tends to lead the lubricant away from the leak point and to feed it to the bearing.

The fact that the chambers are ultimately formed by the butt welding of a steel cap to the body proper of the bearing, eliminates any possibility of any leakage from the chamber as is now the case where screws or rivets and gaskets are employed to effect a complete reservoir.

With the above and other objects in view, the invention consists in certain novel features of construction, combinations and arrangements of parts as will be more fully described and particularly pointed out in the appended claims.

Figure 1:
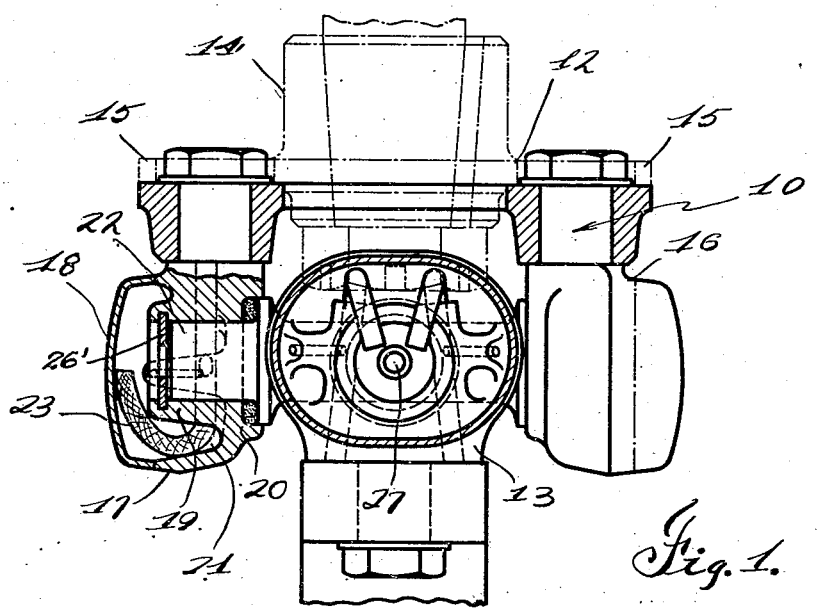
Figures 1 and 2 are views partly in section of a universal joint made in accordance with the present invention.
Figure 2:
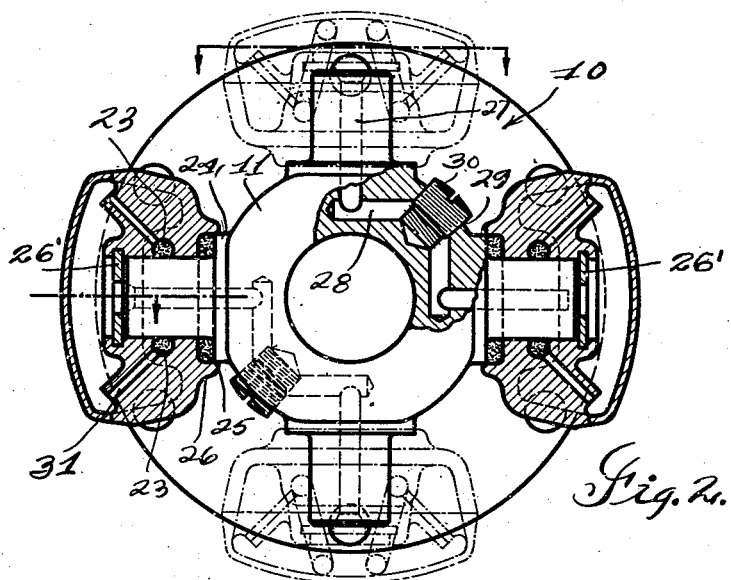

Referring now to the drawings and particularly to Figures 1 and 2 which illustrate the preferred form of my invention, the numeral 10 designates generally a universal joint, comprising an intermediate member 11 and yokes 12 and 13 pivotally secured to the intermediate member with the axes of their bearing points at right angles to each other.

Each yoke comprises the hub 14 for receiving either a driving or driven shaft, and flanges 15 at opposite sides of the hub to which are suitably secured storage chambers 16. Each chamber comprises a cup-shaped bearing member 17 having a cover 18 butt welded thereto, making it air tight and leak proof. Each bearing member is cup-shaped to facilitate a pressure feeding of oil to the bearing face when in operation. The bearing wall 19 itself is of a cylindrical shape and perpendicular with respect to the base 20 of the bearing member and is partially surrounded by a groove 21 so that when the chamber is filled with oil this bearing wall will be partially immersed. Gudgeons 22 project radially outwardly from the member 11 and are journalled in the bearing portions 19. Provision is made for a positive lubrication of each bearing at the load point even after the entire volume of oil in the well is beyond the bearing line or after it has become exhausted. This is accomplished by means of wicks 23. These wicks lie one on each side of the bearing with the holes for carrying them drilled so that a portion of the wick is exposed to the bearing face at the point of the bearing which takes the load. As the joint revolves this wick provides a positive and perpetual wiping of oil upon the load carrying face insuring a positive lubrication of this face under the most extreme conditions of operation. These wicks are made from absorbent material sufficiently long so that they lie at the bottom, as established by centrifugal force, of each chamber. By this method the maintenance of a definite oil level becomes immaterial, the joint functioning as perfectly to the last drop as when full. This method also facilitates use of lighter higher grade oils as well as closer manufacturing tolerances, both of which add increased life to the operating period of the unit. At the base of each gudgeon there is provided an annular shoulder 24 upon which a gasket 25 is positioned for preventing the ingress of foreign matter to the bearing surfaces and to the oil. The base of the storage chamber is provided with an annular flange 26 surrounding the gasket and slightly overlapping the shoulder 24 for the purpose of protecting the gasket and making it more difficult for foreign matter to enter.

A feature of the invention is the means of centralizing the intermediate member. This is accomplished by means of the perforated disks 26′ retained in annular recesses in the top portions of the bearings, the perforations permitting the free passage of oil from the bearing to the storage chambers and vice versa.

For permitting the filling of the storage chambers with lubricant, each gudgeon is provided with a central passage 27 which is extended into the intermediate member 11 where it communicates with one of a pair of passages 28. Each of the latter passages leads to a common or central opening 29. Oil is introduced by pressure into each opening after removing one of the plugs 30 whereupon two of the storage chambers are filled at the same time. For permitting the escapement of trapped air in the storage chambers during filling, each chamber is provided with passages or vents 31 leading from a point near the top of the chamber to one of the openings which carry the wicks. Thus any air is forced past the wicks and the gasket to the outside.

When the joint starts to revolve, there is a tendency through centrifugal force to immediately establish a level of the oil in each of the chambers. This causes the oil between the gudgeon and its seat, to assume a depth of a height equal to the level of the oil which surrounds the outside of the bearing wall. This cup-shaped bearing member is so designed as to gauge the distance the gudgeon protrudes within this oil body of the chamber so that the bearing faces of the gudgeon and its seat are under a combination pressure and wick feed of oil at practically all times.

In this manner, with the construction as thus described, each chamber is made air tight with the aid of the oil film seal at the thrust face between the base 20 and shoulder 24. This air tightness produces the following result. During the period of operation, a considerable heat is generated under normal conditions of lubrication. The oil in the chamber is expanded by this heat and by this expansion is forced out through its only point of egression which is at the thrust face mentioned. After the oil has cooled and resume its normal volume, a vacuum is created within the walls of the chamber which holds the oil back and checks it in its natural tendency to work toward the ends and escape. In this manner of construction, only a small amount of oil is necessary and this small amount is retained indefinitely and is supplied to each bearing from its respective storage chamber.

Figure 3:
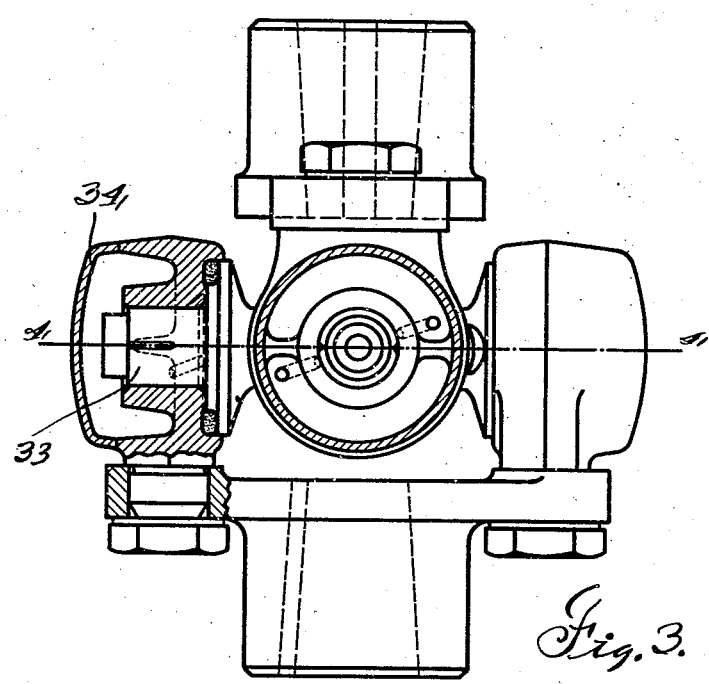
Figure 3 is a modified form of the invention partly in section.
Figure 5:
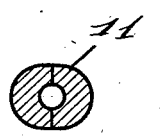
Figure 5 is a section taken on line 5—5 of Figure 4.
Figure 4:
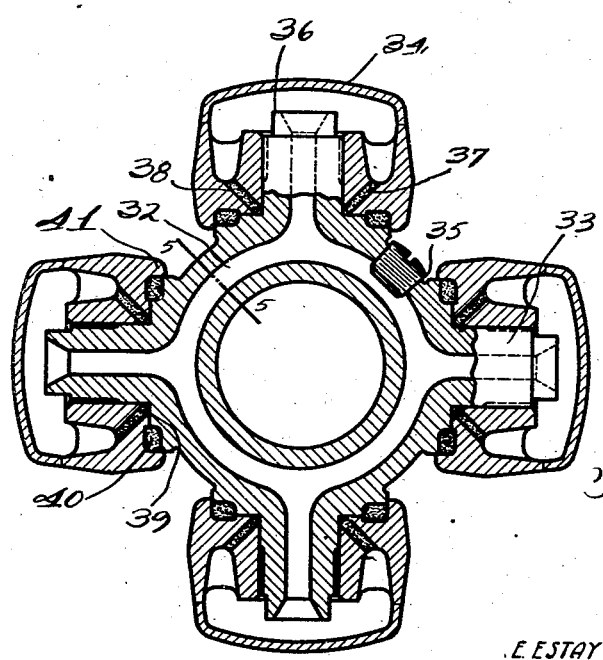
Figure 4 is a section taken on line 4—4 of Figure 3.

Referring to Figures 3 and 4, a modified form of the invention is shown wherein the intermediate member is substantially of a tubular formation, providing an annular passage 32 connecting with central passages in the gudgeons 33 whereby all of the storage chambers 34 may be filled at the same time through the plugged opening 35. The gudgeons are each provided with a portion 36 extending beyond the actual bearing portion thereof to facilitate a turbulence under conditions of quick change in speeds setting up a splash in event the oil level within the cup becomes low. This projection also collects oil under static conditions which is carried to the bearing by capillary attraction. In this construction however, no wicks are employed for conducting lubricant to the bearing faces so that the action will be somewhat similar to that described above with the exception that there will be primarily, only the pressure feed of oil instead of the combination pressure and wick feed.

To permit the escapement of air from the chambers during the filling operation, each chamber as in the case of the preferred construction, is provided with vents 37 passing through its base and opening at the base of the gudgeon. Each vent is provided with a restriction which in the present instance is a porous, fibrous material 38 of a density which does not absorb oil readily under pressure, yet permits the through passage of air under pressure. Thus any air trapped in the storage chambers may escape but the oil is securely retained therein against leakage being permitted to escape only past the bearing surfaces. At the base of each gudgeon, there is provided an annular shoulder 39 upon which the base of the storage chamber rests and which is provided with a recess cooperating with one in the chamber base for positioning a gasket 40 adapted to prevent the ingress of foreign matter to the bearings surfaces and to the oil. The base of the chamber is also provided with an outer annular flange 41 for positioning the chamber relative to the gudgeon and shoulder 39. This construction also produces the same advantages during operation as those described in connection with the construction shown in Figures 1 and 2.

Figure 6:
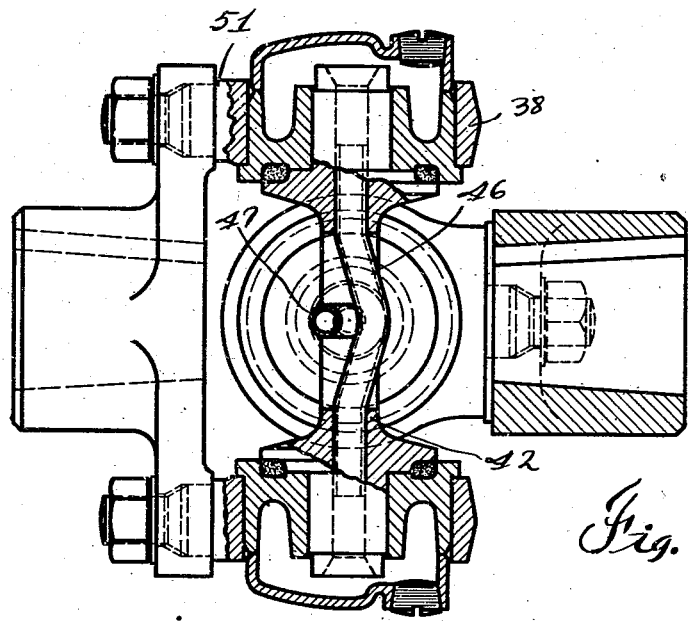
Figures 6 and 7 are still other modified forms of the invention.
Figure 7:
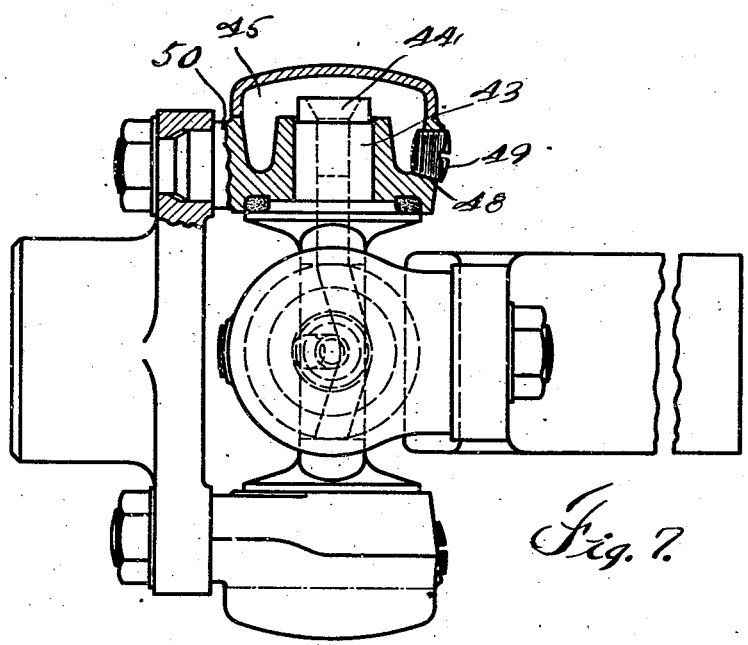

In Figures 6 and 7 a modified form of the invention is disclosed. In this form, the intermediate member comprises a solid ring member having gudgeons projecting therefrom. Each gudgeon 43 however, is provided with a passage 44 therethrough which communicates with its respective storage chamber 45. A pair of tubes 46 and 47 respectively, extend between oppositely disposed gudgeons and place their respective passages in communication. Each storage chamber is provided with a filling opening 48 and a plug 49 closing the opening. In filling the chambers with oil, the two oppositely disposed chambers may be supplied at the same time. This is accomplished by removing one plug and partially unscrewing the other sufficient to vent the air therein. The oil being supplied under pressure drives out the trapped air through the partially unscrewed plug and fills first one chamber and then the other. The other set of chambers may be filled in a similar manner and when sufficient oil has been supplied, both plugs are tightly screwed in place.

The construction shown in Figure 7 is the same as that disclosed in Figure 6 with the exception that each storage chamber is integrally connected to the securing pin 50 in Figure 7, while in Figure 6 it is adapted to set within a ring 51, this ring being an integral part of the pin.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. In a universal joint, in combination, yoke members, an intermediate trunnion member connected to said yoke members, lubricant storage chambers carried by the said members, each of said storage chambers being provided with an opening having a flange surrounding said opening extending inwardly of said chamber forming a bearing for receiving a portion of said trunnion.

2. In a universal joint, in combination, a yoke member, an intermediate member, one of said members being provided with gudgeons projecting therefrom, lubricant storage chambers carried by the other of said members, each of said storage chambers being provided with an opening having a flange surrounding said opening extending inwardly of said chamber forming a bearing for receiving one of said gudgeons.

3. In a universal joint, the combination with a pair of shaft members, of lubricant storage chambers carried by said shaft members, each storage chamber being provided with an opening having a flange surrounding said opening extending inwardly of said chamber forming a bearing, and an intermediate member having gudgeons projecting therefrom and journaled in said bearings.

4. In a universal joint, the combination with a pair of shaft members, of lubricant storage chambers carried by said shaft members, the base portion of each storage chamber being provided with an apertured flanged portion constituting a cylindrical bearing projecting within the chamber, and an intermediate member having gudgeons projecting therefrom and journaled in said bearings.

5. In a universal joint, driving and driven members, an intermediate member having gudgeons, lubricant storage chambers carried by said driving and driven members, each storage chamber being provided with an opening for receiving one of said gudgeons and forming a bearing therefor and having a flange surrounding said opening, said flange projecting into said storage chamber and forming an inner wall thereof cooperating with the outer walls of the chamber to form a lubricant retaining groove surrounding said bearing and gudgeon.

6. In a universal joint, the combination with a pair of shaft members, of lubricant storage chambers carried by said shaft members, each storage chamber being provided with an apertured flanged portion constituting a cylindrical bearing projecting within the chamber, and an intermediate member having gudgeons projecting therefrom and journaled in said bearings.

7. In a universal joint, driving and driven members, an intermediate member having gudgeons and flat seat portions surrounding said gudgeons, lubricant storage chambers carried by said driving and driven members, the base portion of each storage chamber seating upon the aforesaid seat portion and being provided with a flanged portion having an opening for receiving one of said gudgeons and forming a bearing therefor, a gasket positioned between said base and seat portion and an outer flange projecting down from said base and enclosing the outer edge of said seat portion and constituting a guard for said gasket and cooperating therewith to prevent access of foreign matter to the lubricant in said storage chamber.

8. In a universal joint, the combination with a pair of shaft members, of lubricant storage chambers carried by said shaft members, each storage chamber being provided with a flanged portion having an opening forming a bearing, an intermediate member having gudgeons projecting therefrom and journalled in said bearings, and means in each storage chamber for effecting a positive lubricating of the bearing regardless of the quantity of lubricant in said chamber.

9. In a universal joint, the combination with a pair of shaft members, of lubricant storage chambers carried by said shaft members, each storage chamber being provided with a flanged portion having an opening forming a bearing, an intermediate member having gudgeons projecting therefrom and journalled in said bearings, and means in each storage chamber for effecting a positive lubricating of the bearing regardless of the quantity of lubricant in said chamber, said means including a wick exposed to the lubricant in the chamber and having a portion thereof exposed to the bearing face.

10. In a universal joint, the combination with a pair of shaft members, of lubricant storage chambers carried by said shaft members, each storage chamber being provided with a flanged portion having an opening forming a bearing, an intermediate member having gudgeons projecting therefrom and journalled in said bearings, and means in each storage chamber for effecting a positive lubricating of the bearing regardless of the quantity of lubricant in said chamber, said means including a wick exposed to the lubricant in the chamber and having a portion thereof in wiping contact with the gudgeon journalled in the bearing.

11. In a universal joint, driving and driven members, an intermediate member having gudgeons, lubricant storage chambers carried by said driving and driven members, each storage chamber being provided with a flanged portion having an opening for receiving one of said gudgeons and forming a bearing therefor, said flange projecting into said storage chamber and forming an inner wall thereof cooperating with the outer walls of the chamber to form a lubricant retaining groove surrounding said bearing and gudgeon, said flange being provided with a passage for placing the interior of the chamber in communication with the gudgeon, and a wick positioned in said passage having a portion in wiping contact with said gudgeon and having another portion projecting into said chamber and exposed to the lubricant therein.

12. In a universal joint, the combination with a pair of shaft members, of lubricant storage chambers carried by said shaft members, one wall of each storage chamber being provided with a bearing, an intermediate member having gudgeons projecting therefrom and journalled in said bearings, and means in each storage chamber for effecting a positive lubrication of the bearing regardless of the quantity of lubricant in said chamber.

13. In a universal joint, the combination with a pair of shaft members, of lubricant storage chambers carried by said shaft members, one wall of each storage chamber being provided with an opening forming a bearing, an intermediate member having gudgeons projecting therefrom and journalled in said bearings, means associated with each of said bearings and adapted to be engaged by the free ends of said gudgeons for centralizing the intermediate member, and means in each storage chamber for effecting a positive lubrication of the bearing regardless of the quantity of lubricant in said chamber.

14. In a universal joint, the combination with a pair of shaft members, of lubricant storage chambers carried by said members, one wall of each storage chamber being provided with an opening forming a bearing, an intermediate member having gudgeons projecting therefrom and journalled in said bearings, perforated discs positioned in said bearings and adapted to be engaged by the free ends of said gudgeons for centralizing the intermediate member, and means in each storage chamber for effecting a positive lubrication of the bearing regardless of the quantity of lubricant in said chamber.

15. A universal joint comprising a driving and driven member journalled at right angles to each other to a trunnion block, annular reservoirs surrounding each journal and overlapping the end thereof and connected to the end of the journal.

16. In a universal joint of the type described, a lubricant reservoir partly surrounding the journal bearing and overlapping the end thereof, communicating passages leading to the end of the journal bearing so that when the joint is revolving the lubricant will be delivered to the journal bearing through the action of centrifugal force.

In testimony whereof I affix my signature.

E ESTAY CULBERTSON.